United States Patent

Beaman et al.

[15] 3,679,698

[45] July 25, 1972

[54] 2-NITROIMIDAZOLES

[72] Inventors: Alden Gamaliel Beaman, North Caldwell, N.J.; Robert Duschinsky, Pully-Lausanne, Switzerland; William Paul Tautz, New York, N.Y.

[73] Assignee: Hoffmann-La Roche Inc., Nutley, N.J.

[22] Filed: Sept. 12, 1969

[21] Appl. No.: 857,556

Related U.S. Application Data

[63] Continuation-in-part of Ser. No. 543,066, April 18, 1966, Pat. No. 3,505,349, which is a continuation-in-part of Ser. No. 447,103, April 9, 1965, abandoned.

[52] U.S. Cl. ....................260/309, 260/243 R, 260/243 B, 260/244 R, 260/247.5 R, 260/250 R, 260/256.4 N, 260/268 C, 260/293.7, 260/295 K, 260/306.8 R, 260/307 R, 260/307 H, 260/348 A
[51] Int. Cl. ..............................................C07d 49/36
[58] Field of Search....................................260/309

[56] References Cited

UNITED STATES PATENTS

| | | | |
|---|---|---|---|
| 3,037,909 | 6/1962 | Rogers et al. | 260/309 |
| 3,065,133 | 11/1962 | Tchelitcheff | 260/309 |

FOREIGN PATENTS OR APPLICATIONS

| | | | |
|---|---|---|---|
| 639,371 | 4/1964 | Belgium | 260/309 |

OTHER PUBLICATIONS

Lancini et al. Experientia Vol. 21, page 83 (1965). Q1.Q1E9 (January 1965)

Merck Index 7th ed., page 115 Rahway, N.J., Merck, 1960. Rs356.M524

*Primary Examiner*—Natalie Trousof
*Attorney*—Samuel L. Welt, Jon S. Saxes, Bernard S. Leon, William H. Epstein and George M. Gould

[57] ABSTRACT

2-Nitroimidazoles substituted in the 1-position with an alkanoic acid, alkanoic acid ester or an N-substituted alkanoic acid amide which are useful as germicides, antiprotozoal agents and as agents for treatment of pathogenic yeast infections.

16 Claims, No Drawings

2-NITROIMIDAZOLES

CROSS REFERENCE TO RELATED APPLICATIONS

This application is a continuation-in-part of Ser. No. 543,066, filed Apr. 18, 1966 now U.S. Pat. No. 3,505,349 issued Apr. 7, 1970, which is a continuation-in-part of Ser. No. 447,103, filed Apr. 9, 1965 now abandoned.

BRIEF SUMMARY OF THE INVENTION

This invention relates to novel 2-nitroimidazoles. More particularly, the invention relates to substituted 2-nitroimidazoles of the formula

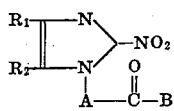

I wherein $R_1$ and $R_2$ are each independently selected from the group consisting of hydrogen, halogen and lower alkyl;

A represents methylene, a polymethylene chain of two to six carbon atoms or a polymethylene chain of two to six carbon atoms in which one of the hydrogen atoms has been replaced by hydroxy; and B represents a member selected from the following:

a. acid and ester groups represented by —O—R wherein R is hydrogen, lower alkyl, phenyl-lower alkyl, substituted phenyl-lower alkyl, amino-lower alkyl or halo-lower alkyl b. an amino radical of the formula:

wherein $R_3$ and $R_4$ are each independently hydrogen, lower alkyl, hydroxy-lower alkyl, lower alkoxy-lower alkyl, amino-lower alkyl, halo-lower alkyl, aryl or aralkyl c. secondary amino groups represented by

wherein Z represents lower alkylene, aza-lower alkylene, N-lower alkylaza-lower alkylene, oxa-lower alkylene or thia-lower alkylene so as to form with the nitrogen atom to which they are attached a 5- or 6-membered nitrogen-containing heterocycle; with the proviso that when A is methylene and B is amino, $R_3$ and $R_4$ are both other than hydrogen or lower alkyl.

Among the compounds of formula I, there are included compounds of the formula:

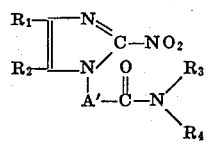

I-A wherein $R_1$, $R_2$, $R_3$ and $R_4$ are as above and A' is a polymethylene chain of two to six carbon atoms or a polymethylene chain of from two to six carbon atoms wherein one of the hydrogen atoms has been replaced by hydroxy; compounds of the formula:

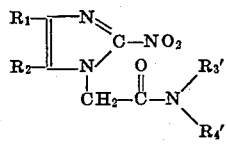

I-B wherein $R_1$ and $R_2$ are as above and $R_3'$ and $R_4'$ are selected from the group consisting of hydroxy-lower alkyl, lower alkoxy-lower alkyl, amino-lower alkyl, halo-lower alkyl, aryl or aralkyl compounds of the formula:

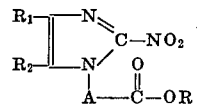

I-C wherein A, R, $R_1$ and $R_2$ are as above; and compounds of the formula:

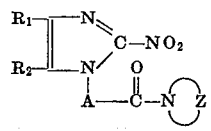

I-D wherein A, Z, $R_1$ and $R_2$ are as above.

DETAILED DESCRIPTION OF THE INVENTION

The term "lower alkyl" and the lower alkyl portion of the term "lower alkoxy" as used throughout this specification denotes both straight chain and branched chain saturated hydrocarbons containing one to seven carbon atoms within the chain including, for example, methyl, ethyl, n-propyl, i-propyl, butyl, i-butyl, sec-butyl, t-butyl, pentyl, hexyl and the like. The terms "halo" and "halogen" denote all four halogens, i.e., chlorine, bromine fluorine and iodine. The term "halo-lower alkyl" represents mono-halo-lower alkyls as well as poly-halo-lower alkyls such as trichloromethyl, trifluoromethyl, 1,2-dichloroethyl and the like. The term "aryl" denotes phenyl, substituted phenyl, 5- and 6-membered heterocyclic aromatic groups or 5- and 6- membered heterocyclic aromatic groups wherein one or more of the hydrogens on the ring carbons have been replaced by halogen, lower alkyl, lower alkoxy, trifluoromethyl, nitro or amino. The 5-membered heterocyclic aromatic groups are those heterocyclic groups containing 1-2 hetero atoms which can be either nitrogen, oxygen of sulfur with the proviso that when there are 2 hetero atoms, one of them must be nitrogen. The 6-membered nitrogen-containing heterocyclic aromatic groups are those containing 1-2 hetero-nitrogen atoms.

The heterocyclic "aryl" groups can be represented by

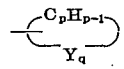

wherein
$p = 3–5$
$q = 1–2$
$p + q = 5–6$

When $p + q = 6$, Y is N; when $p + q = 5$, Y is N, O or S with the proviso that when $q$ is 2, at least one Y is N.

The term "substituted phenyl" denotes phenyl in which one or more of the hydrogens has been replaced by one or more of the functional groups noted below, preferably a substituted phenyl represented by group

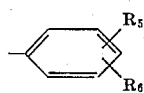

wherein $R_5$ and $R_6$ are each independently hydrogen, halogen, lower alkyl, lower alkoxy, trifluoromethyl, nitro or amino. Exemplary "aryl" groups within the meaning of the term as used in this specification are phenyl, halophenyl, e.g., p-chlorophenyl, o-chlorophenyl, o,p-dichlorophenyl, etc., lower alkylphenyl, e.g., p-methylphenyl, etc., lower alkoxyphenyl, nitrophenyl, aminophenyl, p-trifluoromethylphenyl, pyridyl, e.g., 3-pyridyl, 5-pyridyl, furanyl, thiofuranyl, pyrrolyl, imidazolyl, oxazolyl, isoxazolyl, thiazolyl, pyrimidyl, e.g., 5-pyrimidyl, pyrazinyl and the like.

The term "aralkyl" denotes an alkyl group in which the terminal carbon is substituted by an "aryl" group as defined above. The "aralkyl" groups of this invention are the phenyl-lower alkyls and substituted phenyl-lower alkyls represented by

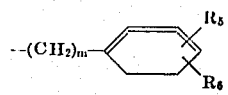

wherein m is an integer from 1 to 6 and $R_5$ and $R_6$ are each independently hydrogen, halogen, lower alkyl, lower alkoxy, trifluoromethyl, nitro or amino and the heterocyclic aromatic-lower alkyls represented by

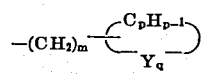

wherein m, p and q have the same significance as above and such heterocyclic aromatic-lower alkyls in which 1 to 2 hydrogens on the ring carbons have been replaced by halogen, lower alkyl, lower alkoxy, nitro, amino or trifluoromethyl.

Illustrative examples of "aralkyl" groups are the following: o-chlorobenzyl, p-chlorobenzyl, o,p-dichlorobenzyl, p-lower alkylbenzyl, p-lower alkoxybenzyl, m,p-di-lower alkoxybenzyl, o-nitrobenzyl, p-aminobenzyl, phenethyl, phenylpropyl, furanyl-lower alkyl, e.g., furfuryl, 2-thienylmethyl, 2-oxazolylmethyl, 3-isoxazolylmethyl, pyridyl-lower alkyl, e.g., 2-pyridylmethyl, 3-pyridylmethyl and 4-pyridylmethyl, pyrimidyl-lower alkyl, e.g., 2-pyrimidylmethyl and 5-pyrimidylmethyl, pyrazinyl-lower alkyl, e.g., 3-pyrazinylmethyl.

The compounds of formula I above wherein B represents the group —O—R and R is other than hydrogen are prepared by reacting 2-nitroimidazole or the appropriately substituted 2-nitroimidazole with a compound of the formula

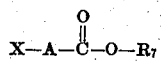

II wherein $R_7$ is lower alkyl, phenyl-lower alkyl, substituted phenyl-lower alkyl, halo-lower alkyl or amino-lower alkyl and X is a leaving group such as a halogen, tosyl or mesyl, preferably halogen, especially chloro to form the esters of formula I wherein B represents the group —O—R wherein R is other than hydrogen. The acids of formula I, i.e., compounds of formula I wherein B represents hydroxy, are prepared by hydrolyzing a compound of formula I wherein B represents —O—R and R is other than hydrogen. The hydrolysis can be readily effected by treatment with any suitable aqueous base, e.g., an inorganic base such as NaOH or a suitable organic base such as a tertiary amine, e.g., triethylamine. Compounds wherein B represents the group

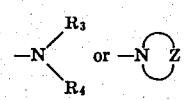

can be prepared from the esters of formula I by treating with the appropriate amine, i.e., a mono- or di-substituted amine of the formula

wherein $R_3$ and $R_4$ have the same significance as above or a secondary amine of the formula

wherein Z has the same significance as above.

Alternatively, the compounds of formula I wherein B represents the group

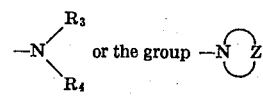

can be prepared by reacting 2-nitroimidazole or the appropriately substituted 2-nitroimidazole with an acetamide of the formula

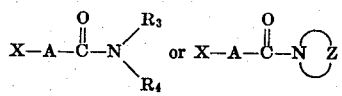

III        IV wherein the symbols X, A, $R_3$, $R_4$ and Z have the same significance as hereinabove. The reaction of nitroimidazole with a compound of formula II or a compound of formulas III or IV is preferably carried out by employing an alkali metal salt of 2-nitroimidazole which can be conveniently prepared by dissolving the 2-nitroimidazole starting material in an alkali metal lower alkoxide, e.g., sodium methoxide, potassium ethoxide, etc. The reactions are suitably carried out in the presence of an inert organic solvent, e.g., N,N-dimethyl-formamide, N,N-dimethylacetamide, dimethylsulfoxide, lower alkanols, e.g., methanol, ethanol, etc., hydrocarbon solvents, such as toluene, etc., or, if preferred, the reaction, particularly in the case of compounds of formulas III and IV, can be carried out in an aqueous medium, or where one of the reactants is a liquid, the reaction can be carried out in the absence of any solvent. The reaction is suitably carried out at an elevated temperature, preferably in the range of about 90° to about 160°. The reaction of an ester of formula I with an amine to form the amides of formula I is suitably carried out in the presence of an inert organic solvent, preferably an alcohol, such as methanol, ethanol and the like, although where the amine reactant is a liquid, it can be conveniently employed as solvent. The reaction is conveniently carried out at room temperature though higher or lower temperatures can also be employed. As a practical matter, the reaction is generally carried out at a temperature in the range of about 0° to about 50°.

Certain of the compounds of formula I wherein A represents a polymethylene chain of two to six carbon atoms in which one of the hydrogen atoms has been replaced by hydroxy may also be prepared by reacting the 2-nitroimidazole starting material with a compound of the formula

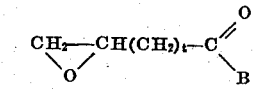

V wherein B has the same significance as hereinabove and $t$ is 0 to 4.

The reaction is preferably carried out in the presence of a small amount of a basic catalyst such as $K_2CO_3$ or by employing the sodium salt of 2-nitroimidazole starting material in an inert solvent such as an alcohol, for example, ethanol or, if desired, where the formula V reactant is liquid, the reaction can be carried out in an excess of the formula V reactant. The reaction temperature is not critical, though preferably it is carried out at an elevated temperature, i.e., between about room temperature and the reflux temperature of the reaction mixture and more preferably at a temperature between about 60° and 130°.

The 2-nitroimidazole starting materials suitable for use in preparing compounds of formula I can be represented by the formula

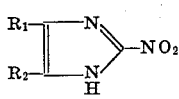   VI wherein $R_1$ and $R_2$ are each independently hydrogen, halogen or lower alkyl. Compounds of formula VI wherein one or both of $R_1$ and $R_2$ are halogen have not been described in the literature heretofore and, thus, constitute a part of this invention. They are prepared by halogenating 2-nitroimidazole or a 4(5)-lower alkyl-2-nitroimidazole according to halogenation techniques which are per se known in the art.

Those compounds of formula I which are basic in character can be converted to their acid addition salts by reacting with pharmaceutically acceptable acid addition salts which are prepared from pharmaceutically acceptable acids such as hydrohalic, sulfuric, phosphoric and the like, organic acids, such as acetic, citric, tartaric and the like.

The novel compounds of formula I and, where available, their acid addition salts with pharmaceutically acceptable acids are active against bacteria, pathogenic yeasts and protozoa, and are useful as germicides, anti-protozoal agents, and as agents for the treatment of pathogenic yeast infections. More particularly, the compounds of formula I are useful in the treatment of infectious diseases caused by Trichomonas, e.g., T. vaginalis, T. fetus, etc., Histomonas, e.g., H. malegradis, etc., Trypanosomes, e.g., T. cruzi, T. rhodesiense, T. cougolense, etc. They can be administered orally, parenterally topically or in suppository form, e.g., in combination with the usual pharmaceutical adjuvants. Typical oral internal dosage ranges from about 20 to about 200 mg/kg animal body weight with dosage adjusted to species and individual requirements. Typical formulations are given below.

Tablet Formulation

| | Per Tablet |
|---|---|
| Compound of formula I | 100 mg. |
| Lactose, U.S.P. | 202 mg. |
| Corn starch, U.S.P. | 80 mg. |
| Prehydrolyzed food grade corn starch | 20 mg. |
| Calcium stearate | 8 mg. |
| Total Weight | 410 mg. |

Procedure:

1. The compound of formula I, lactose, corn starch, and the prehydrolyzed corn starch were blended in a suitable mixer.

2. The mixture was granulated to a heavy paste with water and the moist mass was passed through a No. 12 screen. It was then dried overnight at 110°F.

3. The dried granules were passed through a No. 16 screen and transferred to a suitable mixer. The calcium stearate was added and mixed until uniform.

4. The mixture was compressed at a tablet weight of 410 mg. using tablet punches having a diameter of approximately three-eighths inch. (Tablets may be either flat or biconvex and may be scored if desired.)

Parenteral Formulation

| | Per cc. |
|---|---|
| Compound of formula I | 10.2 mg. |
| Propylene glycol | 0.4 cc. |
| Benzyl alcohol (benzaldehyde free) | 0.015 cc. |
| Ethanol (anhydrous) | 0.10 cc. |
| Sodium benzoate | 48.8 mg. |
| Benzoic acid | 1.2 mg. |
| Water for injection q.s. | 1.0 cc. |

Procedure (for 10,000 cc.):

1. The 102 gm. of the compound of formula I were dissolved in 150 cc. of benzyl alcohol; 4,000 cc. of propylene glycol and 1,000 cc. of ethanol were added.

2. The 12 gm. of benzoic acid were dissolved in the above. The 488 gm. of sodium benzoate dissolved in 3,000 cc. of water for injection were added. The solution was brought up to final volume of 10,000 cc. with water for injection.

3. The solution was filtered through an 02 Selas candle, filled into suitable size ampuls, gassed with $N_2$ and sealed. It was then autoclaved at 10 p.s.i. for 30 minutes.

Capsule Formulation

| | Per Capsule |
|---|---|
| Compound of formula I | 100 mg. |
| Lactose | 83 mg. |
| Corn starch | 37 mg. |
| Talc | 5 mg. |
| Total Weight | 225 mg. |

Procedure:

1. The compound of formula I, lactose, and corn starch were mixed in a suitable mixer.

2. The mixture was further blended by passing through a Fitzpatrick Comminuting Machine with a No. 1A screen with knives forward.

3. The blended powder was returned to the mixer, the talc added and blended thoroughly. The mixture was then filled into No. 4 hard shell gelatin capsules on a Parke Davis capsulating machine.

Suppository Formulation

| | Per 1.3 Gm. Suppository |
|---|---|
| Compound of formula I | 0.100 gm. |
| Refined synthetic cocoa butter, coconut derived | 1,155 gm. |
| Carnauba wax | 0.045 gm. |

Procedure:

1. The cocoa butter and the carnauba wax were melted in a suitable size glass lined container, mixed well and cooled to 45°C.

2. The compound of formula I, which had been reduced to a fine powder with no lumps, was added and stirred until completely and uniformly dispersed.

3. The mixture was poured into suppository molds to yield suppositories having an individual weight of 1.3 gms.

4. The suppositories were removed from molds and cooled. They were individually wrapped in wax paper for packaging.

Topical Cream

| | Per 100 Gms. Cream |
|---|---|
| Compound of formula I | 10.2 gm. |
| Stearic acid | 15.0 gm. |
| Mineral oil light | 1.5 gm. |
| Sorbitan monostearate | 2.5 gm. |
| Methyl p-hydroxybenzoate | 0.08 gm. |
| Propyl p-hydroxybenzoate | 0.02 gm. |
| Sorbitol solution N.F. | 5.00 gm. |
| Polyoxyethylene sorbitan monostearate | 1.69 gm. |
| Distilled water | 67.5 gm. |

Procedure:

1. The stearic acid, mineral oil, sorbitan monostearate and methyl and propyl p-hydroxybenzoates were melted together at approximately 75°C. in a suitable size stainless steel, jacketed kettle with agitator.

2. A suspension of the compound of formula I in a solution of polyoxyethylene sorbitan monostearate, sorbitol N.F. and distilled water was added to the melted mixture.

3. The mixture was stirred at 75°C. until uniform, and the temperature was gradually reduced with continuous stirring.

4. When the temperature reached 48°C., the cream was transferred to storage containers.

5. The cream was packaged in wax lined, tin tubes (opal glass jars may also be used).

This invention will be more fully understood from the following examples which are intended to illustrate the invention and are not to be construed as limitative thereof. All temperatures are stated in degrees Centigrade.

EXAMPLE 1

Preparation of 2-nitro-1-imidazoleacetic acid ethyl ester

To a suspension of 15.1 g. (133 mmoles) of powered sublimed 2-nitroimidazole in 1.00 ml. of N,N-dimethylformamide was added 30.1 ml. of 4.44 N NaOCH$_3$ in methanol. To the pink solution was added a bit of 2-nitroimidazole until the color just turned yellow again. The solution was stirred and heated to 151° to remove methanol, cooled to 95° and 20.0 ml. (23.2 g., 189 mmoles) of ethylchloroacetate was added. The temperature fell to 90°, and then rose to 113° over about 3 min. and a precipitate formed. The mixture was stirred and heated at 100°–115° for 17 min. and the dimethylformamide was removed in vacuo (0.2 mm, bath 55°). The oil was slurried in 125 ml. of absolute ethanol and filtered from the white solid precipitate. The filtrate was evaporated to an oil in vacuo (0.2 mm, bath 44°). This oil was shaken with 175 ml. of anhydrous ether (all dissolved except for a slight haze) and 2–3 g. of charcoal was added and the mixture filtered at once rapidly. From the yellow filtrate crystals soon deposited. The mixture was cooled in the freezer for 1.5 hrs. and the crystals collected, washed with ether and dried. The crystals so obtained melted at 47°–49°. Recrystallized from 400 ml. of boiling ether, the product was obtained as crystals melting at 48.5°–49.5°.

EXAMPLE 2

Preparation of N-methyl-2-nitro-1-imidazoleacetamide

Sublimed 2-nitroimidazole (6.95 g., 61.5 mmoles) was slurried in 45 ml. of N,N-dimethylformamide and 13.9 ml. (61.5 mmoles) of 4.44 N NaOCH$_3$ in methanol was added. Then 7.97 g. (74 mmoles) of N-methylchloroacetamide was added, and the solution was stirred and heated in an open flask. The mixture was faintly cloudy at 80°. It was stirred for 15 minutes at 130°–153°. The mixture was cooled, the NaCl filtered and washed with dimethylformamide, and the filtrate plus wash was evaporated to dryness in vacuo (0.1 mm, 50° bath). The solid which remained was ground with 20 ml. of distilled water, filtered, and washed with two 5 ml. portions of water. The slightly moist solid was recrystallized from 110 ml. of boiling water (3 g. of charcoal) to give pale yellow needles of N-methyl-2-nitro-1-imidazoleacetamide, melting point 174°–175°.

Example 3

Preparation of 2-nitro-1-imidazoleacetamide

Sublimed 2-nitroimidazole (17.65 grams, 156 mmoles) was slurried in 85 ml. of N,N-dimethylformamide and 35.2 ml. of 4.44 N NaOCH$_3$ solution in methanol (156 mmoles) was added. (The solution of 2-nitroimidazole in a deficient amount of NaOCH$_3$ in MeOH plus dimethylformamide is yellow. Excess NaOCH$_3$ gives a pink color. In case of temporary excess of NaOCH$_3$ because not all the solid 2-nitroimidazole has dissolved, the pink color becomes yellow again when more of the solid dissolves. The end point is very sharp. One drop of NaOCH$_3$ gives a marked change from yellow to pink at the end point). Then 17.5 g. (187 mmoles) of chloroacetamide was added. The solution was stirred and heated in an open flask. The mixture because hazy (precipitation of NaCl) at 105°. The mixture was stirred at 150°–160° for 10 minutes and cooled. The salt was filtered and washed with dimethylformamide, and the filtrate plus wash was evaporated to dryness in vacuo (0.1 mm. 50° bath). The solid which remained was ground in a mortar with 50 ml. of distilled water, filtered, washed with five 5 ml. portions of water, and dried. The crude material was recrystallized from 200 ml. of boiling distilled water (7 g. of charcoal) to give pale yellow spear shaped crystals of 2-nitro-1-imidazoleacetamide, melting point 182°–183.5°.

Example 4

Preparation of N-(2-hydroxyethyl)-2-nitro-1-imidazoleacetamide

A slurry of 10.0 g. (54 mmoles) of 2-nitro-1-imidazole acetic acid methyl ester in 50 ml. of absolute methanol was stirred and 10.0 ml. (10.0 g., 163 mmoles) of 2-aminoethanol (ethanol amine) was added. The solid completely dissolved after about 10 min. and after an additional 15 min. a new solid began to form. The mixture was allowed to stand at room temperature for 18 hours and was then cooled in the freezer for 7 hrs. The solid was filtered, washed with 2 × 10 ml. absolute MeOH and dried. The product was recrystallized from 95 ml. of boiling absolute ethanol to give the product as needles m.p. 162°–163°.

$$\lambda_{max.}^{EtOH} \ 314 \ m\mu, \ \epsilon=7900$$

EXAMPLE 5

Preparation of N-isopropyl-2-nitro-1-imidazoleacetamide

A slurry of 10.0 g. (54 mmoles) of 2-nitro-1-imidazole acetic acid methyl ester in 50 ml. of absolute methanol was stirred and 25 ml. of isopropyl amine was added. The solid completely dissolved and overnight a new solid had formed. The mixture was stirred at room temperature for 26 hours, cooled in the freezer 17 hours and the solid collected, washed with 10 ml. of absolute MeOH and dried. Recrystallized from 75 ml. of boiling absolute EtOH, the product was obtained as fine white needles, m.p., 195°–196°.

$$\lambda_{max.}^{EtOH} \ 314 \ m\mu, \ \epsilon=8100$$

Example 6

Preparation of N-benzyl-2-nitro-1-imidazoleacetamide

A solution of 10.0 g. (54 mmoles) of 2-nitro-1-imidazoleacetic acid methyl ester plus 20 ml. of benzylamine in 100 ml. of absolute methanol was allowed to stand at room temperature overnight with formation of crystals. The mixture was refrigerated several hours and the crystals collected, m.p. 187.5–189.5. The filtrate was concentrated in vacuo, and the solid obtained was recrystallized from 150 ml. of ethyl acetate to give additional product having melting point 187.5–189. Recrystallized from 325 ml. of boiling ethanol, the product was obtained as crystals, m.p. 188.5°—190°.

$$\lambda_{max.}^{EtOH} \ 313 \ m\mu, \ \epsilon=7600$$

Example 7

Preparation of N,N-dimethyl-2-nitro-1-imidazoleacetamide

Fifty milliliters of absolute methanol was cooled in an ice bath and gaseous dimethylamine was bubbled in until the final volume was 125 ml. Then 10 g. (54 mmoles) of 2-nitro-1-imidazoleacetic acid methyl ester was added and the mixture stirred in a stoppered flask. The solid dissolved, and after about 10–15 min. a new solid began to form. The mixture was allowed to stand at room temperature for 24 hours and then cooled in the freezer for 17 hours. The crystals were collected, washed with 2 × 10 ml. of absolute methanol and dried. Recrystallized from 90 ml. of boiling absolute ethanol (charcoal) the product was obtained as pale yellow flakelet crystals, m.p. 129°–130°.

$$\lambda_{max.}^{EtOH}\ 314\ m\mu,\ \epsilon = 8400$$

Example 8

Preparation of N-ethyl-2-nitro-1-imidazoleacetamide 50 milliliters of absolute methanol was cooled in an ice bath and monoethylamine was poured in slowly from a cylinder until the total volume was about 100 ml. Then 10.0 g. (54 mmoles) of 2-nitro-1-imidazoleacetic acid methyl ester was added and the mixture stirred in a stoppered flask. The solid dissolved and after about 10 min. a new solid formed. The mixture was allowed to stand at room temperature for 19 hours and was then placed in the freezer for 4 hours. The crystalline solid was filtered, washed with 10 ml. of methanol and dried. Recrystallized from 75 ml. of boiling absolute ethanol, the product was obtained as crystals melting at 181°–182°, $$\lambda_{max.}^{EtOH}\ 313m\mu,\ \epsilon = 7700.$$

Example 9

Preparation of N-(3-methoxypropyl)-2-nitro-1-imidazoleacetamide

A solution of 10.0 g. (54 mmoles) of 2-nitro-1-imidazoleacetic acid methylester plus 20 ml. of 3-methoxypropylamine in 100 ml. of absolute methanol was allowed to stand at room temperature overnight and was then evaporated to dryness in vacuo. The resulting solid was recrystallized from 50 ml. of ethylacetate to give the product as crystals melting at 116°–118.5°. Recrystallized from 70 ml. of ethyl acetate, the product melted at 118°–119°.

$$\lambda_{max.}^{EtOH}\ 313m\mu,\ \epsilon = 7500.$$

Example 10

Preparation of N-furfuryl-2-nitro-1-imidazoleacetamide

A solution of 10.0 g. (54 mmoles) of 2-nitro-1-imidazoleacetic acid methyl ester plus 20 ml. of furfurylamine in 60 ml. of absolute methanol was allowed to stand at room temperature overnight. The solution was seeded and refrigerated for several hours. The crystals when filtered, washed with cold methanol and dried, melted at 178.5°–180°. Recrystallized from 250 ml. of ethanol, the product was obtained as crystals melting at 179°—180°, $$\lambda_{max.}^{EtOH}\ 312m\mu,\ \epsilon = 7500.$$

Example 11

Preparation of N-butyl-2-nitro-1-imidazoleacetamide

A solution of 10.0 g. (54 mmoles) of 2-nitro-1-imidazoleacetic acid methyl ester plus 20 ml. of n-butylamine in 100 ml. of absolute methanol was allowed to stand at room temperature overnight. The solution was evaporated to dryness in vacuo. The resulting solid was recrystallized from 35 ml. of ethyl acetate (charcoal) to give the product melting at 124°–125°. (The product softened at 117° and the melting point varied with rate of heating.)

$$\lambda_{max.}^{EtOH}\ 312m\mu,\ \epsilon = 7600.$$

Example 12

Preparation of 4-[2-(2-nitro-1-imidazolyl) acetyl]morpholine

A solution of 10.0 g. (54 mmoles) of 2-nitro-1-imidazoleacetic acid methyl ester in 50 ml. of morpholine was allowed to stand at room temperature for 5 ½ days. The solution was evaporated to a yellow oil in vacuo (0.1 mm bath 50°). This was dissolved in 25 ml. of warm ethyl acetate and the solution refrigerated to give a crystalline product. Recrystallized from 55 ml. of ethanol, the product was obtained as crystals melting at 113.5°–115°.

$$\lambda_{max.}^{EtOH}\ 315m\mu,\ \epsilon = 7500.$$

Example 13

Preparation of N-[2-(2-nitro-1-imidazolyl)acetyl]piperidine

A solution of 10.0 g. (54 mmoles) of 2-nitro-1-imidazoleacetic acid methyl ester in 50 ml. of piperidine was allowed to stand at room temperature for 2.5 days. The resulting slurry of crystals was concentrated in vacuo to an oily solid. This was dissolved in 30 ml. of hot ethyl acetate and the solution refrigerated to give crystals melting at 102°–103.5°. Recrystallized twice more from ethyl acetate gave the product with melting point unchanged.

$$\lambda_{max.}^{EtOH}\ 313m\mu,\ \epsilon = 7500.$$

Example 14

Preparation of N-(2-chlorobenzyl)-2-nitro-1-imidazoleacetamide

A solution of 5.00 g. (27.0 mmoles) of 2-nitro-1-imidazoleacetic acid methyl ester plus 10 ml. of 2-chlorobenzylamine in 50 ml. of methanol was allowed to stand at room temperature overnight and was then refrigerated to give crystals melting at 206°–208°. Recrystallized from ethanol (charcoal), the product was obtained as crystals melting at 208°–209°.

$$(74\%)\ \lambda_{max.}^{iPrOH}\ 314m\mu,\ \epsilon = 7500.$$

Example 15

Preparation of N-isobutyl-2-nitro-1-imidazoleacetamide

A solution of 7.00 g. (37.8 mmoles) of 2-nitro-1-imidazoleacetic acid methyl ester in 14 ml. of isobutylamine plus 70 ml. methanol was allowed to stand at room temperature for 5 days and evaporated in vacuo to give a yellow solid. Recrystallized once from 65 ml. of absolute ethanol (charcoal) and once from ethyl acetate, the product was obtained as crystals melting at 147.5°—148.5°.

$$\lambda_{max.}^{iPrOH}\ 312m\mu,\ \epsilon = 7500.$$

Example 16

Preparation of N-propyl-2-nitro-1-imidazoleacetamide

A solution of 7.00 g. (37.8 mmoles) of 2-nitro-1-imidazoleacetic acid methyl ester and 14 ml. of n-propylamine in 70 ml. of methanol was allowed to stand at room temperature overnight. On cooling, there was obtained crystals melting at 159°–160°. Recrystallized from 30 ml. of boiling ethanol (charcoal), the product was obtained as crystals melting at 159°—160.5°.

$$\lambda_{max.}^{iPrOH}\ 313m\mu,\ \epsilon = 7600.$$

Example 17

Preparation of N-(3-pyridylmethyl)-2-nitro-1-imidazoleacetamide

A solution of 7.00 g. (37.8 mmoles) of 2-nitro-1-imidazoleacetic acid methyl ester and 14 ml. of 3-aminomethylpyridine in 70 ml. of methanol was allowed to stand at room temperature for 4 days and refrigerated to give crystals melting at 189°—192°. Recrystallized once from 400 ml. of ethanol (charcoal) and once from 230 ml. of water gave the product as crystals melting at 194°—195.5°.

$\lambda_{max.}^{iPrOH}$ 256, 262, 268, 315, m$\mu$, $\epsilon$=4600, 4700, 3900, 7600.

Example 18

Preparation of N-(2-pyridylmethyl)-2-nitro-1-imidazoleacetamide

A solution of 8.00 g. (43.2 mmoles) of 2-nitro-1-imidazoleacetic acid methyl ester plus 16 ml. of 2-aminomethylpyridine in 70 ml. of methanol was allowed to stand at room temperature for 2 days. The crystalline solid which deposited was collected. Recrystallized from 55 ml. of boiling distilled water, the product was obtained as crystals melting at 162.5°—163.5°.

$\lambda_{max.}^{iPrOH}$ 254, 260, 267, 313 m$\mu$, $\epsilon$=5300, 5600, 4600, 7800.

Example 19

Preparation of N,N-diethyl-2-nitro-1-imidazoleacetamide

A suspension of 10.25 g. (90.5 mmoles) of ground and sieved sublimed 2-nitroimidazole in 100 ml. of dimethylformamide (DMF) was stirred magnetically and 20.2 ml. of 4.44 N NaOCH$_3$ in CH$_3$OH was added. The azomycin dissolved and the solution became pink; addition of a pinch of azomycin gave a yellow solution which was heated to 150° and cooled to 97° and 14.5 ml. (den. 1.10, 16.0 g., 107 mmoles) of N,N-diethylchloroacetamide was added. The temperature fell to 93° and then rose spontaneously to 97° and a precipitate formed. The mixture was heated and stirred at 100°—120° for 20 minutes. The DMF was evaporated in vacuo (oil pump) and the gum shaken with water to remove the salt. The oil was then dissolved in acetone and the solution allowed to evaporate in a shallow dish. Crystals formed gradually. After 24 hours, the crystalline product was slurried in 7 ml. of 3:1 vol:vol H$_2$O:EtOH, filtered and washed with two times 2.5 ml. of the same solvent mixture and dried. The filtrate plus wash from this material was allowed to evaporate to give a moist solid which was sucked as dry as feasible on a Büchner and slurried on the Büchner in 4 ml. and then 3 ml. of cold 3:1 vol:vol H$_2$O:EtOH and dried. Recrystallized from 33 ml. of warm 3:1 vol:vol H$_2$:EtOH gave the product as crystals melting at 42°—44°. Upon slow evaporation of the filtrate from the first crop, chunky crystals melting at 60°—62.5° were obtained. The I.R. spectra of chloroform solutions of these differently melting crystals were identical, indicating different crystal forms.

$\lambda_{max}^{EtOH}$ 313m$\mu$, $\epsilon$=8300.

Example 20

Preparation of N-methyl-2-nitro-1-imidazolebutyramide

To a stirred slurry of 5.10 g. of ground and sieved sublimed 2-nitroimidazole in 50 ml. of dimethylformamide (DMF) was added 9.95 ml. of 4.44 N NaOCH$_3$ in CH$_3$OH to give a pink solution. Addition of a pinch of azomycin gave a yellow solution which was heated to 150° and let cool to 109° and with stirring 10 ml. (about 10 g. or 73 mmoles) of methyl-4-chlorobutyrate was added. The temperature fell and did not rise spontaneously. The mixture was stirred at 120°—130° for 30 minutes. (UV spectrum at 16 min. indicates the reaction was nearly, but not entirely, complete). The mixture was cooled, the NaCl filtered and the filtrate was evaporated to an amber oil in vacuo (0.3 mm. bath 45°). Meanwhile, 25 ml. of anhydrous methanol was cooled in an ice bath and anhydrous monomethylamine was bubbled in until the volume was about 50 to 60 ml. and this solution was cooled to 15° and added to the amber oily ester prepared above and the resulting solution stirred magnetically at room temperature for 3 hours and allowed to stand at room temperature overnight. The solution was allowed to evaporate in a shallow dish giving moist crystals which after being slurried in 25 ml. of ethanol, filtered, washed with 2 times 5 ml. of ethanol and dried, melted at 119.5°—121°. Recrystallized from 70 ml. of boiling absolute ethanol (charcoal), the product was obtained as needles melting at 125°—126°.

$\lambda_{max.}^{EtOH}$ 314 m$\mu$, $\epsilon$=6400

Example 21

Preparation of N-methyl-2-nitro-1-imidazolevaleramide

To a stirred slurry of 5.10 g. of ground and sieved sublimed 2-nitroimidazole in 50 ml. of dimethylformamide (DMF) was added 10.0 ml. of 4.44 N CH$_3$ONa in CH$_3$OH to give a pink solution. Addition of a pinch of azomycin gave a yellow solution which was heated to 150° and let cool to 120°, and with stirring, 10 ml. (about 12 g. or 62 mmoles) of methyl-5-bromovalerate was added. The temperature fell to 108° and then rose spontaneously to 114°. The mixture was stirred at 110°—118° for 20 minutes. (UV spectrum of reaction mixture indicated complete reaction). The DMF was removed in vacuo finally heating at 75° (bath) 0.5 mm. to remove excess ester. The remaining oil was shaken with 50 ml. of CCl$_4$ and the NaBr was filtered and sucked dry. The filtrate plus wash was evaporated in vacuo at 60°, 0.5 mm. to give an amber oil.

Meanwhile 25 ml. of absolute methanol was cooled in an ice bath and anhydrous monomethylamine was bubbled in until the volume was about 50 ml. and this solution was added to the oily ester above. The resulting solution was stirred at room temperature for 5 hours, and was allowed to stand at room temperature overnight. The solution was allowed to evaporate in a shallow dish and the oil which formed was dissolved in absolute ethanol and the ethanol allowed to evaporate and this operation repeated to give a moist crystalline solid which after filtering, washing with 4 ml. of absolute ethanol and drying, melted at 88°—90°. Recrystallized first from 20 ml. of absolute ethanol and then from 25 ml. of benzene plus 2 ml. of absolute ethanol, the product was obtained as heavy crystals melting at 94.5°—96.5°.

$\lambda_{max.}^{EtOH}$ 313 m$\mu$, $\epsilon$=7900

Example 22

Preparation of N-(2-aminoethyl)-2-nitro-1-imidazoleacetamide hydrochloride

A solution of 8.00 g. (43.2 mmoles) of 2-nitro-1-imidazoleacetic acid methyl ester in 296 ml. of 98—100 percent ethylene diamine was allowed to stand at room temperature for 3 hours. The solution was evaporated to dryness in vacuo (oil pump) and the solid dissolved in 60 ml. of methanol, 1 g. of Norit A added, filtered and the filtrate evaporated in vacuo to a solid. This was recrystallized from 20 ml. of absolute ethanol (refrigerating 1—2 hours) to give a solid melting at 136°—138° (m.p. 144.5°—145.5° another run). (The free base was unstable to storage and melted progressively lower on repeated recrystallization.) It was dissolved in 125 ml. of absolute ethanol and anhydrous HCl was bubbled into the solution for 30 minutes. The solid which formed was collected, washed with absolute ethanol, and dried at room temperature. Recrystallized twice from about 20 volumes of 95 percent ethanol, the product was obtained as a solid melting at 189°—190° (gas evolution).

$\lambda_{max.}^{0.1NNaOH}$ 323 m$\mu$, $\epsilon = 7900$

Example 23

Preparation of N-3,4-dimethoxyphenethyl-2-nitro-1-imidazoleacetamide

A solution of 4.00 g. (21.7 mmoles) of 2-nitro-1-imidazoleacetic acid methyl ester plus 12 ml. of $\beta$-(3,4-dimethoxyphenyl)-ethylamine in 35 ml. of absolute methanol was stirred magnetically at room temperature for 1¼ hours by which time considerable solid had formed, and the slurry was allowed to stand at room temperature overnight. The slurry was cooled and the solid was filtered, washed with 25 ml. and then with 10 ml. of absolute methanol and dried. Recrystallized from 350 ml. of boiling absolute ethanol, the product was obtained as colorless needles melting at 150.5°—151°.

$\lambda_{max.}^{iPrOH}$ 282, 286, 313 m$\mu$, $\epsilon = 6200, 6200, 7800$

Example 24

Preparation of N-(2-nitrobenzyl)-2-nitro-1-imidazoleacetamide:

Method A

To a partial solution of 14.00 g. (75.0 mmoles) of o-nitrobenzylamine hydrochloride in 120 ml. of methanol was added 15.1 ml. of 4.52 N CH$_3$ONa in methanol. The precipitate of NaCl was filtered and to the filtrate was added 8.00 g. (43.2 mmoles) of 2-nitro-1-imidazoleacetic acid methyl ester which dissolved. The solution was allowed to stand at room temperature for 20 days. The mixture was refrigerated, and the crystals collected, m.p. 176°—177°. Recrystallized from 200 ml. of absolute ethanol, the product was obtained as crystals melting at 175.5°—176.5°.

$\lambda_{max.}^{iPrOH}$ 255, 312 m$\mu$, $\epsilon = 7800, 8500$.

Method B

A solution of 3.11 g. (27.5 mmoles) of 2-nitroimidazole in 30 ml. of dimethylformamide (DMF) plus 6.09 ml. of 4.52 N CH$_3$ONa in methanol was heated to 152° and cooled to 110° and 6.35 g. (27.8 mmoles) of N-(o-nitrobenzyl)chloroacetamide was added and the mixture heated at 100°—120° for 30 minutes. The UV spectrum of reaction solution indicated that the reaction was complete. The mixture was concentrated at oil pump vacuum (bath 60°) to a dark brown oil which was dissolved in 25 ml. of absolute ethanol and the solution allowed to stand at room temperature over the weekend to give brown crystals m.p. 164°—166°. Recrystallized from ethanol (charcoal) the product was obtained as crystals melting at 166°—168°. A second recrystallization from ethanol gave crystals melting at 166.5°—168.5°. IR study demonstrated that the crystals melting at 166.5°—168.5° and those melting at 175.5°—176.5° (Method A above) are polymorphic.

Example 25

Preparation of 2-nitro-1-imidazoleacet-p-anisidide

To a stirred slurry of 7.15 g. (63 mmoles) of ground and sieved sublimed 2-nitroimidazole in 100 ml. of dimethylformamide (DMF) was added 14.0 ml. (62 mmoles) of 4.44 N NaOCH$_3$ in CH$_3$OH; the transient pink color went back to yellow. The mixture was heated to 151° and let cool to 115°, and 12.8 g. (64 mmoles) of chloroacet-p-anisidide, m.p. 120°—121.5° was added. The temperature fell to 100° and then rose spontaneously to 101° and the solution got hazy. The mixture was stirred at 115°—125° for 20 minutes, (UV spectrum indicates complete reaction), cooled and the salt filtered and the filtrate evaporated (0.5 mm., bath 48°) to give a solid. The solid was ground in a mortar with about 75 ml. of absolute ethanol until a smooth paste resulted, and this was filtered and the solid washed with 3 times 25 ml. of absolute ethanol and dried. The dried product was powdered finely and recrystallized from 1250 ml. of boiling absolute ethanol (5 g. charcoal) to give fluffy crystals melting at 207°—207.5°.

$\lambda_{max.}^{iPrOH}$ 250, 300 (shoulder), 314 m$\mu$, $\epsilon = 18,200, 7200, 7700$.

Example 26

Preparation of N-tert-butyl-2-nitro-1-imidazoleacetamide

A solution of 7.00 g. (61.9 mmoles) of 2-nitroimidazole in 70 ml. of dimethylformamide (DMF) plus 13.7 ml. of 4.52 N NaOCH$_3$ in CH$_3$OH was heated to 152° and cooled to 100° and 9.30 g. (62.1 mmoles) of N-tert-butylchloroacetamide was added. The mixture was stirred at 85°–100° for 40 minutes, (UV, $\lambda_{max.}^{0.1N\ NaOH}$ 326 m$\mu$ indicated complete reaction), and then evaporated to dryness in vacuo (oil pump). The residue was extracted with 100 ml. of acetone and the solid filtered and washed thoroughly with acetone. The acetone filtrate was treated with Norit A, filtered, and evaporated to dryness in vacuo. The resulting solid was recrystallized from 35 ml. of ethyl acetate (1 g. Norit A) to give the product as a solid melting at 209.5°–211°.

$\lambda_{max.}^{iPrOH}$ 313 m$\mu$, $\epsilon = 7100$

EXAMPLE 27

Preparation of N-(4-methoxybenzyl)-2-nitro-1-imidazoleacetamide

A solution of 9.00 g. (48.6 mmoles) of 2-nitro-1-imidazoleacetic acid methyl ester plus 25 g. of p-methoxybenzylamine in 80 ml. of absolute methanol was stirred magnetically at room temperature. After 25 minutes there was a large amount of solid formed. The slurry was allowed to stand for an additional 2 hours at room temperature and was placed in the freezer for 1.5 hours. The solid was filtered, washed with 2 times 20 ml. of absolute methanol and dried, m.p. 210°–213°. Recrystallized from 1500 ml. of boiling absolute ethanol the product was obtained as fluffy needles melting at 211°–211.5°.

$\lambda_{max.}^{iPrOH}$ 275, 282, 312 m$\mu$; $\epsilon = 4600, 5200, 7800$

EXAMPLE 28

Preparation of N-(2-methyl-4-amino-5-pyrimidinylmethyl)-2-nitro-1-imidazoleacetamide A solution of 8.00 g. (43.2 mmoles) of 2-nitro-1-imidazole acetic acid methyl ester plus 17.84 g. (129 mmoles) of crude 2-methyl-4-amino-5-methylamino-pyrimidine m.p. 124°–127° in 100 ml. of absolute methanol was stirred magnetically for 24 hours at room temperature during which time some solid formed. The mixture was allowed to stand at room temperature for an additional 5 days (total 6 days) and the solid was filtered and washed with 3 times 25 ml. of absolute methanol (most of amber color went into filtrate plus wash), and dried, m.p. 284° dec. This product was dissolved in 2800 ml. of boiling distilled water, 6.0 g. of Norit "A" was added, the solution was boiled and filtered and carbon washed. The filtrate was refrigerated overnight to give the product as colorless fine needles melting at 299°-300° dec. (taken rapidly from 270°).

$\lambda_{max.}^{iPrOH}$ 235, 280, 315 m$\mu$; $\epsilon$=12,800; 8000; 7700

EXAMPLE 29

Preparation of N-(2-imidazolyl)-2-nitro-1-imidazoleacetamide

A mixture of 14.70 g. (111 mmoles) of finely powdered 2-aminoimidazole sulfate, 10.00 g. (54.0 mmoles) of 2-nitro-1-imidazoleacetic acid methyl ester, 250 ml. of absolute methanol, and 23.5 ml. of 4.44 N CH$_3$ONa in methanol was stirred at room temperature for 3 days. The solid which was present was filtered, washed with absolute methanol and dried; the dry solid was slurried in 75 ml. of distilled water at room temperature, filtered, and washed with water. The moist insoluble solid was boiled with 175 ml. of distilled water (charcoal) and filtered hot. From the yellow filtrate after refrigeration overnight there was obtained fine yellow needles of the product having a melting point of 238°-239° dec. (from room temperature) or melting point of 241°-242° dec. (rapidly from 200°).

$\lambda_{max.}^{iPrOH}$ 255, 315 m$\mu$; $\epsilon$=13,000; 7400

EXAMPLE 30

Preparation of 2-nitro-1-imidazolelactic acid ethyl ester

A mixture of 10.0 g. (88.5 mmoles) of powdered and sieved sublimed 2-nitroimidazole, 1.00 g. of anh. K$_2$CO$_3$, 100 ml. of absolute ethanol, and 20.78 g. (19.00 ml., density 1.093, 179 mmoles) of ethyl glycidate b.p. 77°-79° at 34 mm. was refluxed with stirring until the U.V. spectrum of the reaction mixture in 0.1 N base gave a maximum at 327 m$\mu$ and no shoulder about 375 m$\mu$ (unreacted azomycin). This required about 40 min. At this stage the azomycin had completely dissolved and the initially yellow solution had become amber. The hot solution was filtered and the filtrate was refrigerated for about 2 hours to yield a solid which upon recrystallizing from 300 ml. of boiling absolute ethanol (3.6 g. of Norit A) gave pale yellow needles of melting point 147°-148.5°.

$\lambda_{max.}^{iPrOH}$ 315 m$\mu$, $\epsilon$=7100

EXAMPLE 31

Preparation of N-(4-aminobenzyl)-2-nitro-1-imidazoleacetamide

Two hundred milliliters of absolute ethanol was saturated with ammonia gas at 0° and 30 g. (0.20 moles) of p-nitrobenzo-nitrile was added and the mixture was hydrogenated using Raney Nickel catalyst and 1,200 lb. hydrogen. Three moles of hydrogen was absorbed exothermically causing the temperature to rise to 61°, and then the mixture was heated at 80°-90° and 2 moles more of hydrogen was absorbed. The mixture was cooled, the catalyst removed, and the light yellow filtrate was evaporated (water aspirator vacuum) to give a yellow oil the infrared spectrum of which was compatible with p-aminobenzylamine and which was used directly in the next step.

A solution of 5.10 g. (27.5 mmoles) of 2-nitro-1-imidazoleacetic acid methyl ester and 10.0 ml. (10.9 g., density 1.09, 89.0 mmoles) of p-aminobenzylamine, prepared as above, in 50 ml. of absolute methanol was stirred at room temperature for 2 hours allowed to stand at room temperature for 16 hours and then refrigerated. The light amber colored needles which formed were collected, washed with ethanol, and dried to give a product melting at 204°-207° dec. The product was finely powdered and recrystallized from 1,500 ml. of boiling ethanol (4 to 5 g. Norit A) to give needles melting at 208°-209°. Recrystallized again from ethanol, the melting point was unchanged, $\lambda_{max.}^{iPrOH}$ 240, 308 m$\mu$, $\epsilon$=14,900; 7,600

EXAMPLE 32

Preparation of N-isopropyl-3-(2-nitro-1-imidazolyl)lactamide

2-Nitro-1-imidazole lactic acid ethyl ester (1.41 g., 6.15 mmoles) was slurried in 30 ml. of absolute methanol and with stirring 16 ml. of isopropyl amine was added whereupon the solid dissolved. The solution was stirred at room temperature for 17 hours. All insoluable solid was removed by filtration (IR spectrum indicates that it is an ester not an amide) and the filtrate was allowed to evaporate to give a gum plus a solid. Portions of absolute ethanol were added and allowed to evaporate until an amine odor was no longer noticeable, and the resulting sticky solid was slurried in 3 to 4 ml. of absolute ethanol, filtered and washed with 3 times 1 ml. of ethanol and dried. Recrystallized from 20 ml. of boiling absolute ethanol the product was obtained a solid melting at 152.5°-153°.

$\lambda_{max.}^{iPrOH}$ 311 m$\mu$, $\epsilon$=6500

EXAMPLE 33

Preparation of N,N-dimethyl-4-(2-nitro-1-imidazole)butyramide

Method A

To a slurry of 15.20 g. (134 mmoles) of sublimed 2-nitroimidazole in 150 ml. of N,N-dimethylformamide was added 30.4 ml. of 4.44 N CH$_3$ONa in CH$_3$OH. The solution turned pink and was made yellow by the addition of a pinch of 2-nitroimidazole. The mixture was heated to 150° with stirring, was allowed to cool to 126° and 30 ml. of methyl-4-chlorobutyrate was added. The mixture was stirred at 120°-130° for 30 min., cooled to 15°, and the NaCl filtered and washed with dimethylformamide. The filtrate from the salt was evaporated to an amber oil in vacuo (0.8 mm., bath 50°) to give 4-(2-nitro-1-imidazole)butyric acid methyl ester which was used in the next step without further purification.

Absolute methanol (20 ml.) was cooled in an ice bath and anhydrous dimethylamine was bubbled in until the volume was nearly 50 ml. To this solution was added 3.0 ml. (3.9 g.) of 4-(2-nitro-1-imidazole)butyric acid methyl ester obtained as above and the solution was allowed to stand at room temperature for 69 hours. The solution was allowed to evaporate to an oil plus crystals. Portions of absolute ethanol were added and allowed to evaporate until the amine odor was gone. The final slurry of crystals in about 5 ml. of ethanol was filtered and the crystals washed with 2 times 2 ml. of ethanol. The product was crystallized from 10 ml. of boiling absolute ethanol (0.1 g. Norit A) to give colorless crystals melting at 88°-89°.

$\lambda_{max.}^{iPrOH}$ 314 m$\mu$, $\epsilon$=7700

Method B

A solution of 21 g. (0.525 moles) of NaOH in 150 ml. of distilled water was cooled to −12° and 84 ml. of 25 percent aqueous dimethylamine was added and the whole solution cooled to −12° and 52.4 g. (0.371 moles) of 4-chlorobutyrylchloride was added dropwise with stirring over a period of 17 min. while maintaining the reaction temperature in the range −12° to −3°. The reaction was stirred at −12° to −5° for 45 min., and the pH was adjusted to 6 with 8.5 ml. of glacial acetic acid. The solution was saturated with NaCl (about 55–60 g.) and the oil plus water was extracted with 450 ml. and then with 250 ml. of CHCl₃. The CHCl₃ extracts were combined, dried over anhydrous MgSo₄, the MgSo₄ filtered, and the filtrate concentrated in vacuo (0.25 mm., bath 52°) to a deep yellow oil. The N,N-dimethyl-4-chlorobutyramide thus obtained was used in the next step without further purifications.

To a slurry of 15.20 g (134 mmoles) of sublimed 2-nitroimidazole in 150 ml. of N,N-dimethylformamide was added 29.3 ml. of 4.56 N CH₃ONa in CH₃OH. The solution turned pink and was made yellow by the addition of a pinch of 2-nitroimidazole. The solution was stirred and heated to 152° C. and allowed to cool to 131° C. whereupon 20.0 ml. (21.8 g. density 1.09, 146 mmoles) of N,N-dimethyl-4-chlorobutyramide prepared as above was added. The temperature fell to 121° and then rose spontaneously to 138°, and a precipitate formed. The slurry was stirred at 120°–125° for 30 min. and was then cooled to 15°. The NaCl was filtered and washed. The filtrate was evaporated in vacuo (0.25 mm., bath 54°) to give a solid which was slurried while still warm in 35 ml. of absolute ethanol which removed the color and the whole was refrigerated. The solid was filtered, washed with 2 times 15 ml. of ethanol and dried. Recrystallized from 200 ml. of boiling ethanol (3 g. Norit A) there was obtained pale yellow crystals melting at 86°–87.5° having an infrared spectrum in CHCl₃ identical to that of the material prepared by Method A above.

EXAMPLE 34

Preparation of n-isopropyl-4-(2-nitro-1-imidazole)butyramide

A solution of 20.0 g. (0.500 moles) of NaOH in 200 ml. of distilled water was cooled to incipient freezing and 35 ml. (24 g. density 0.69, 0.41 moles) of isopropyl amine was added and the solution cooled to −10°C. With stirring 52.5 g. (0.372 moles) of 4-chlorobutyryl chloride was added dropwise over a period of 17 min. while maintaining the temperature in the range −10° to +1°. A precipitate formed. The slurry was stirred briefly and the pH adjusted to 6 by the addition of 4.3 ml. of glacial acetic acid. The slurry was refrigerated and the solid was filtered, washed with 4 times 25 ml. of cold distilled water, and dried. The N-isopropyl-4-chlorobutyramide m.p. 52°–54 thus obtained was used in the next step without further purification.

To a slurry of 10.1 g. (89.2 mmoles) of sublimed 2-nitroimidazole in 100 ml. of N,N-dimethylformamide was added 20.4 ml. of 4.34 N CH₃ONa in CH₃OH. The pink color turned back to yellow as the last of the 2-nitroimidazole dissolved. With stirring the solution was heated to 151°C., allowed to cool to 121°, and 16.0 g. (98.0 mmoles) of N-isopropyl-4-chlorobutyramide was added. The mixture was stirred at 120°–130° for 30 min. (at which stage the ultraviolet absorption spectrum in 0.1N NaOH solution indicated no unreacted 2-nitroimidazole) and was then cooled to 20°. The NaCl was filtered and washed with dimethylformamide. The filtrate was concentrated to an oil in vacuo (0.1 mm., bath 55°). The oil crystallized on cooling. This solid was recrystallized from 30 ml. of warm absolute ethanol to give crystals melting at 99°–103bL. Recrystallized from 40 ml. of hot ethanol (Norit A) there was obtained crystals melting at 103°–103.5°.

$\lambda_{max.}^{iPrOH}$ 313 m$\mu$, $\epsilon$=7800

EXAMPLE 35

Preparation of N,N-dimethyl-5-(2-nitro-1-imidazole)valeramide

To a slurry of 15.00 g. (132.6 mmoles) of sublimed 2-nitroimidazole in 150 ml. of N,N-dimethylformamide was added 30.6 ml. of 4.34 N CH₃ONa in CH₃OH. The solution turned pink and was made yellow by the addition of a pinch of 2-nitroimidazole. The solution was stirred and heated to 152°, and was allowed to cool to 110° whereupon 30 g. (153 mmoles) of methyl-5-bromovalerate was added. The temperature fell to 102° and rose spontaneously to 110°. The mixture was stirred at 100°–120° for 30 min. The mixture was evaporated to an oil in vacuo (0.5 mm., bath 75°). The oil was shaken with 150 ml. of 1:1 (vol:vol) CHCl₃:CCl₄ and the NaBr was filtered and washed. The filtrate was again evaporated in vacuo (0.5 mm., bath 75°) to a dark brown oil. This was distilled (in vacuo) to give a main fraction b.p. 158°–159° at 0.1 mm. The distillate contained a small amount of 2-nitroimidazole which was removed by dissolving the distillate in CHCl₃ and extracting with aqueous NaHCO₃ solution. The dried CHCl₃ layer was evaporated to give 5-(2-nitro-1-imidazole)valeric acid methyl ester as a yellow oil.

Absolute methanol (20 ml.) was cooled in an ice bath and anhydrous dimethylamine was bubbled in until the volume was nearly 50 ml. To this solution was added 5.0 g. (22 mmoles) of 5-(2-nitro-1-imidazole)valeric acid methyl ester and the solution was allowed to stand at room temperature for 11 days (until no appreciable amount of starting material remained as indicated by TLC). The solution was evaporated to give a solid which was recrystallized from 15 ml. of ethylacetate (Norit A) to give a solid melting at 83°–85°. Recrystallized twice from 25 parts by volume of CCl₄ there was obtained crystals melting at 85.5°–87° C.

$\lambda_{max.}^{iPrOH}$ 313 m$\mu$, $\epsilon$=7800

EXAMPLE 36

Preparation of N,N-dimethyl-3-(2-nitro-1-imidazolyl)lactamide

Absolute methanol (25 ml.) was cooled in an ice bath and anhydrous dimethylamine was bubbled in until the volume of the solution was about 55 ml. Then 1.40 g. (61.1 mmoles) of 2-nitro-1-imidazole lactic acid ethyl ester was added and swirled till dissolved. The solution was allowed to stand at room temperature for 17 hours and then allowed to evaporate to give a gum which was triturated with 5 ml. of 1:1 vol:vol, ethanol:benzene. The solid which formed was filtered and washed with ethanol. Recrystallized from 20 ml. of boiling ethanol (Norit A) there was obtained pale yellow crystals melting at 130°–131.5°.

$\lambda_{max.}^{iPrOH}$ 318 m$\mu$, $\epsilon$=7200

EXAMPLE 37

Preparation of N-benzyl-4-(2-nitro-1-imidazole)butyramide

A solution of 20.0 g. (0.500 moles) of NaOH in 200 ml. of distilled water was cooled to freezing and 43 ml. (42 g., density 0.98, 0.392 moles) of benzylamine was added and the solution cooled to −10° and 48.0 g. (0.340 moles) of 4-chlorobutyryl chloride was added dropwise with stirring over a period of 14 min. maintaining the reaction temperature in the range −10° to 0°. A white precipitate formed. The slurry was stirred in the cold for an additional 5 min. and the pH was adjusted to 6 by the addition of 10.0 ml. of glacial acetic acid. The slurry was refrigerated briefly, and the solid was filtered, washed with 4 times 25 ml. of cold distilled water and dried. The N-benzyl-4-chlorobutyramide thus obtained melted at 66°–67.5° and was used in the next step without further purification.

To a slurry of 10.1 g. (89.2 mmoles) of sublimed 2-nitroimidazole in 100 ml. of N,N-dimethylformamide was added 20.4 ml. of 4.34 N CH₃ONa in CH₃OH. The pink color turned back to yellow as the last of the 2-nitroimidazole dissolved. The solution was heated to 151° with stirring, allowed to cool to 130° and 20.0 g. (95 mmoles) of N-benzyl-4-chlorobutyramide was added. The mixture was stirred at 120°-128° for 30 min., cooled to 20°, and the NaCl was filtered and washed with dimethylformamide. The filtrate was evaporated to an amber oil in vacuo (0.1 mm., bath 55°). The oil was dissolved in 100 ml. of ethanol and the solution was allowed to evaporate slowly in a shallow dish. The brown solid which formed was ground with 30 ml. of ethanol in a mortar, filtered, and washed with two times 10 ml. of ethanol (most of the color went into the ethanol) and dried. Again dissolved in 60 ml. of boiling ethanol with about 3 g. of Norit A added, the solution was boiled and filtered hot. The yellow filtrate was refrigerated to give a nearly colorless solid melting at 89.5°-90°.

$$\lambda_{max.}^{iPrOH} \ 313 \ m\mu, \ \epsilon=7600$$

EXAMPLE 38

Preparation of N-benzyl-3-(2-nitro-1-imidazolyl)lactamide

To a stirred solution of 27 ml. of absolute methanol plus 5.0 ml. of benzyl amine was added 1.40 g. (61.1 mmoles) of 2-nitro-1-imidazole lactic acid ethyl ester which soon dissolved. The solution was stirred overnight at room temperature and the solution was allowed to evaporate yielding a moist solid. Upon recrystallization from 20 ml. of boiling ethanol and after standing 3 days in a freezer there was obtained a light yellow solid. Recrystallized from 25 ml. of boiling ethanol (Norit A) there was obtained needles melting at 151°-151.5°.

$$\lambda_{max.}^{iPrOH} \ 312 \ m\mu, \ \epsilon=6500$$

EXAMPLE 39

Preparation of N-isopropyl-6-(2-nitro-1-imidazole)caproamide

A mixture of 300 g. of 6-bromocapronitrile plus 1,200 ml. of 48 percent aqueous HBr was refluxed for 10 hours. The mixture of aqueous phase, oil and solid was extracted with 3 times 2 l. of ether, the ether extracts combined, dried over Na$_2$SO$_4$, and evaporated to an oil. The oil was distilled to give (after a forerun) a main fraction b.p. 106°-127° (0.5-1.0 mm.), which crystallized. If desired this material could be recrystallized from an equal weight of petroleum ether to give crystals of 6-bromocaproic acid melting at 34°-35°.

A mixture of 40 g. of 6-bromocaproic acid plus 60 ml. of thionyl chloride was refluxed for one hour and the excess thionyl chloride was removed in vacuo (10 mm., bath 40°) to leave 6-bromocaproyl chloride as a yellow oil which was used in the next step without further purification.

A solution of 2.87 g. (7.13 mmoles) of NaOH in 27 ml. of distilled water was cooled to 10° C. and 5.25 ml. (3.64 g., density 0.694, 61.6 mmoles) of isopropyl amine was added and the solution cooled to −5°. With stirring the 6-bromocaproyl chloride prepared as above from 10 g. of 6-bromocaproic acid was added dropwise maintaining the reaction temperature between −5° and +5° whereupon a precipitate formed. The pH at the end of the reaction was 6. The slurry was refrigerated 15 min. and the solid was filtered washed with distilled water and dried. The N-isopropyl-6-bromocaproamide was used in the next step without further purification.

Sublimed 2-nitroimidazole (2.82 g., 24.9 mmoles) was dissolved in 5.74 ml. of 4.34 N CH$_3$ONa in CH$_3$OH. Addition of a pinch of 2-nitroimidazole changed the color of the solution from pink to yellow. N,N-dimethylformamide (25 ml.) was added and the solution was heated to 152°, cooled to 100°, and 5.90 g. (25.1 mmoles) of N-isopropyl-6-bromocaproamide was added. The mixture was stirred at 100°-110° for 30 min. The mixture was evaporated to an oil plus solids in vacuo (0.3 mm., bath 60°). The residue was slurried in a mixture of acetone and CHCl$_3$, the NaBr filtered, and the filtrate evaporated in vacuo to an oil which crystallized. The solid was triturated with 10 ml. of distilled water, filtered and dried. The dried solid was dissolved in 50 ml. of ethyl acetate, slight amount insoluble material filtered off and the ethyl acetate removed. The resulting solid was recrystallized from 150 ml. of distilled water (1 g. Norit A) to give crystals melting at 87°-88.

$$\lambda_{max.}^{iPrOH} \ 314 \ m\mu, \ \epsilon=8000$$

EXAMPLE 40

Preparation of N-methyl-3-(2-nitro-1-imidazolyl)lactamide

Absolute methanol (25 ml.) was cooled in an ice bath and anhydrous monomethylamine was bubbled in until the total volume was about 60 ml. With stirring there was added 1.40 g. (61.1 mmoles) of 3-(2-nitro-1-imidazole) lactic acid ethyl ester which readily dissolved. The solution was stirred at room temperature for 19 hours and then allowed to evaporate. The oil which remained was dissolved in about 10 ml. of absolute ethanol and the ethanol allowed to evaporate. The solution process was repeated several times until a solid was obtained. This solid was slurried in 5 ml. of absolute ethanol, filtered, washed with 2 ml. of ethanol, and dried. Recrystallization of the dry product once from 5 ml. of absolute ethanol and a second time from 4 ml. of ethanol gave chunky crystals melting at 129°-132°.

$$\lambda_{max.}^{iPrOH} \ 312 \ m\mu, \ \epsilon=4400$$

EXAMPLE 41

Preparation of N-methyl-6-(2-nitro-1-imidazole) caproamide

A solution of 2.39 g. (59.7 mmoles) of sodium hydroxide in 20 ml. of distilled water was cooled to 0° and 5.8 g. of a solution of 40 percent aqueous methylamine (2.32 g. methylamine content or 74.9 mmoles) was added and the whole cooled to −5°. With stirring the 6-bromocaproyl chloride prepared from 7.27 g. (37.3 mmoles) of 6-bromocaproic acid (prepared as described hereinabove) was added dropwise maintaining the temperature between −5° and +5°. A solid formed. The slurry was cooled for 15 min. and then the pH was adjusted to 6 with glacial acetic acid. Since the solid melted below room temperature, the mixture was extracted with 4 times 75 ml. of CHCl$_3$. The CHCl$_3$ extracts were combined, dried over anhydrous MgSO$_4$, filtered, and evaporated to an oil in vacuo. The N-methyl-6-bromocaproamide was used in the next step without further purification.

Sublimed 2-nitroimidazole (3.60 g., 31.8 mmoles) was dissolved in 7.34 ml. of 4.34 N CH$_3$ONa in CH$_3$OH. Thirty milliliters of N,N-dimethylformamide was added, and the mixture was heated to 153°, cooled to 110° and 7.93 g. (37.3 mmoles) of N-methyl-6bromocaproamide was added. The mixture was stirred at 100°-115° for 1 hour. The solution was concentrated to an oil plus solids in vacuo (0.3 mm., bath 60°). Acetone (50 ml.) was added and the NaBr was filtered and the filtrate evaporated to an oil in vacuo (0.3 mm., bath 60°). The oil was recrystallized from 30 ml. of boiling ethyl acetate (1 g. Norit A) to give the product as a solid, melting at 87.5°-92°. The product was crystallized twice from 2 parts of boiling distilled water to give crystals melting at 95°-97.5°. Recrystallized from 3 parts of absolute ethanol there was obtained crystals melting at 95°-97°.

$$\lambda_{max.}^{iPrOH} \ 313 \ m\mu, \ \epsilon=7900$$

EXAMPLE 42

Preparation of N-isobutyl-4-(2-nitro-1-imidazole)butyramide

To a solution of 3.6 g. of crude 4-(2-nitro-1-imidazole) butyric acid methyl ester (prepared as described hereinabove) in 20 ml. of absolute methanol was added 10 ml. of isobutylamine, and the solution was allowed to stand at room temperature for 17 days. Thin layer chromatography indicated no starting material was left. The solution was allowed to evaporate in a shallow dish to give oil plus crystals. To the oil and crystal mixture was added 20 ml. portions of ethanol which were allowed to evaporate slowly, until there was no more amine odor. The resulting solid was ground with 2-3 ml. of absolute ethanol in a mortar, filtered, washed with 1 ml. of ethanol, and dried. Recrystallized from 3 ml. of boiling absolute ethanol and cooled in a freezer, there was obtained crystals melting at 79.5°-81.5°.

$$\lambda_{max.}^{iPrOH} \ 313 \ m\mu, \ \epsilon = 8100$$

EXAMPLE 43

Preparation of N-isopropyl-5-(2-nitro-1-imidazole)valeramide

A solution of 14.5 g. (0.362 moles) of NaOH in 160 ml. of distilled water was cooled to freezing and 25 ml. (17.2 g., density 0.690, 0.292 moles) of isopropylamine was added and the solution cooled to −12° C. With stirring 40.3 g. (0.260 moles) of 5-chloroveleryl chloride was added dropwise over a period of 17 minutes while maintaining the reaction temperature at −12° to −5°. The mixture was stirred at −8° to −3° for an additional 30 minutes and the pH was adjusted to 6 with 6.7 ml. of glacial acetic acid. The solid which formed melted below room temperature so the mixture was extracted with 500 ml. and then with 2 times 100 ml. of CHCl$_3$. The CHCl$_3$ extracts were combined, dried over anh. MgSO$_4$, filtered, and the filtrate evaporated to a pale straw colored oil in vacuo ( 0.2 mm., bath 59°). The N-isopropyl-5-chlorovaleramide thus obtained was used in the next step without further purification.

To a slurry of 15.2 g. (134 mmoles) of sublimed 2-nitroimidazole in 150 ml. of N,N-dimethylformamide was added 29.3 ml. of 4.56 N CH$_3$ONa in CH$_3$OH. The solid dissolved and the pink color was changed back to yellow by the addition of a pinch of 2-nitro-imidazole. With stirring the solution was heated to 152°, was allowed to cool to 130°, and 26.0 g. (25.0 ml., density 1.04, 146 mmoles) of N-isopropyl-5-chlorovaleramide prepared as above was added. The mixture was stirred at 125°-136° for 30 minutes at which stage the U.V. spectrum in 0.1 N NaOH solution showed no trace of unreacted 2-nitroimidazole. The mixture was cooled to 13°, and the NaCl was filtered and washed with dimethylformamide. The filtrate plus wash was evaporated to an oil in vacuo (0.15 mm., bath 58°). The oil was dissolved in 35 ml. of absolute ethanol and the solution was allowed to evaporate in a shallow dish to give crystals. The crystals were ground in a mortar with 10 ml. of absolute ethanol, filtered and washed with 3 to 4 ml. of ethanol, and dried. The dried product was dissolved in 45 ml. CHCl$_3$ and filtered from about 0.2 g. of insoluble material. The solution was allowed to evaporate and the solid was recrystallized from 22 ml. of absolute ethanol (cooled freezer) to give crystals melting at 82°—83°. Recrystallized from 1:2 (v:v) CHCl$_3$:CCl$_4$, the product was obtained as fluffy colorless needles melting at 83°-83.5°.

$$\lambda_{max.}^{iPrOH} \ 313 \ m\mu, \ \epsilon = 8400$$

EXAMPLE 44

Preparation of N,N-dimethyl-6-(2-nitro-1-imidazole)caproamide

A solution of 6.63 g. (0.166 mmoles) of NaOH in 22 ml. of distilled water was cooled to −5° and 37 g. of 25 percent solution of aqueous diemthylamine (9.25 g., 0.205 moles dimethylamine) was added and cooled to 0°. With stirring the crude 6-bromocaproyl chloride prepared from 20 g. (102 mmoles) of 6-bromocaproic acid (prepared as described hereinabove) was added dropwise maintaining the temperature between 0° and 5°. The mixture was then allowed to stand in the cold for an additional 15 minutes, the pH WAS ADJUSTED TO 6 with glacial acetic acid, and 10 g. of NaCl was added. The mixture was extracted with 4 times 75 ml. of CHCl$_3$, the CHCl$_3$ extracts combined; dried over anh. MgSO$_4$, filtered and concentrated to a yellow oil in vacuo (0.3 mm. bath 50°). The N,N-dimethyl-6-bromocaproamide thus obtained was used in the next step without further purification.

To a solution of 10.0 g. (88.4 mmoles) of sublimed 2-nitroimidazole in 19.5 ml. of 4.56 N CH$_3$ONa in methanol was added enough solid 2-nitroimidazole to change the color of the solution from pink to yellow. Dimethylformamide (100 ml.) was added and the solution was heated to 152° and let cool to 100°. Then 21.6 g. (96.4 mmoles) of N,N-dimethyl-6-bromocaproamide prepared as above was added. The mixture was heated at 100°-120° for 45 minutes. The U.V. spectrum in 0.1 N NaOH solution indicated absence of unreacted 2-nitroimidazole. The mixture was evaporated to an oil plus solid in vacuo (0.3 mm., bath 60°). The residue was slurried in a mixture of CHCl$_3$ plus acetone and the NaBr was filtered. The filtrate was evaporated in vacuo (0.3 mm., bath 60°) to an oil which crystallized upon refrigerating overnight. This solid was recrystallized from 25 ml. of boiling absolute ethanol (2 g. Norit A) to give crystals melting at 73.5°-75.5°. Recrystallized from ethanol the product was obtained as crystals melting at 73.5°-75.5°

$$\lambda_{max.}^{iPrOH} \ 314 \ m\mu, \ \epsilon = 7900$$

EXAMPLE 45

Preparation of N-benzyl-6-(2-nitro-1-imidazole)caproamide

A solution of 5.80 g. (144 mmoles) of NaOH in 50 ml. of distilled water was cooled to 0° and 12.10 g. (113 mmoles) of benzylamine was added and the solution cooled to 02 . With vigorous stirring the 6-bromocaproyl chloride prepared from 20 g. (102 mmoles) of 6-bromocaproic acid (prepared as described hereinabove) was added dropwise maintaining the temperature between 0° and 5°. The mixture was cooled for an additional 15 minutes, and the solid was filtered, washed with distilled water and dried. The dried solid was recrystallized by dissolving in 100 ml. of ether and letting the solution evaporate to a small volume. There was thus obtained crystalline N-benzyl-6-bromocaproamide melting at 55°-57°.

To a slurry of 3.68 g. (32.6 mmoles) of sublimed 2-nitroimidazole in 35 ml. of N,N-dimethylformamide was added 7.16 ml. of 4.56 N CH$_3$ONa in CH$_3$OH. The solid dissolved to a pink solution which was made yellow by the addition of a pinch of 2-nitroimidazole. The solution was heated to 152°, cooled to 110°, and 9.37 g. (33.0 moles) of recrystallized N-benzyl-6-bromocaproamide was added. The solution was heated at 100°-115° for 30 minutes. The U.V. spectrum in 0.1N NaOH indicated that there was no unreacted 2-nitroimidazole. The mixture was evaporate in vacuo (0.3 mm., bath 60°) to a yellow solid. This was slurried with 100 ml. of CHCl$_3$ and the NaBr filtered. The filtrated was concentrated in vacuo to a yellow solid which was slurried with 35 ml. of absolute ethanol, cooled, filtered, washed with ethanol and dried to give a solid melting at 102°- 103.5°. Recrystallized from 17 ml. of boiling ethanol the product was obtained as crystals melting at 103°-104.5°.

$$\lambda_{max.}^{iPrOH} \ 314 \ m\mu, \ \epsilon = 7700$$

EXAMPLE 46

Preparation of 3-(2-nitro-1-imidazole)propionic acid ethyl ester

Sublimed 2-nitroimidazole (35.5 g., 312 mmoles) was dissolved in 146 ml. of 2.09 N $C_2H_5ONa$ in ethanol and 52.0 g. (381 mmoles) of ethyl-3-chloropropionate was added and the mixture refluxed for 16 hours. The solution was evaporated to an oil plus solids in vacuo, and this material shaken with a mixture of 500 ml. of ethyl acetate plus 400 ml. of 1 N NaOH. The layers were separated, and the ethyl acetate was extracted with 100 ml. of 1 N NaOH and then with 3 times 100 ml. of distilled water. The ethyl acetate was dried over anhydrous $MgSO_4$, filtered, and evaporated to an oil in vacuo (0.3 mm., bath 60°). The oil crystallized on refrigerating to give the product melting at 45°–47°. Recrystallized from 50 ml. of $CCl_4$ (2 g. Norit A) the product was obtained as crystals melting at 47.5°–49°.

$\lambda_{max.}^{iPrOH}$ 313 m$\mu$, $\epsilon = 7600$

EXAMPLE 47

Preparation of 2-nitro-1-imidazoleacetic acid methyl ester

To a slurry of 100 g. (885 mmoles) of powdered sublimed 2-nitroimidazole in 500 ml. of N,N-dimethylformamide was added 200 ml. of 4.44 N $NaOCH_3$ in $CH_3OH$. The solution became pink and just enough 2-nitroimidazole was added to give a yellow solution. The solution was heated to 153° in an open flask to remove methanol, cooled to 90° and 135 ml. (166 g., 1.53 moles) of methylchloro acetate added. The temperature spontaneously rose to 122° and then fell with formation of a precipitate. The mixture was heated at 105°–115° for 15 minutes and the solvent removed in vacuo (0.2 mm., bath 50°) to give an oil. To the oil was added 500 ml. of reagent acetone. The product dissolved and salt which precipitated out was removed by filtration. The acetone solution was evaporated in vacuo to give a tan solid which was slurried in 200 ml. of ethanol, filtered, washed with 50 ml. of ethanol and dried. This dried solid was recrystallized from 350 ml. boiling ethanol (12 g. Norit A) to give pale yellow flakelets melting at 94°–95.

$\lambda_{max.}^{EtOH}$ 311 m$\mu$, $\epsilon = 7700$

EXAMPLE 48

Preparation of 2-nitro-1-imidazoleacetic acid

A solution of 20.0 g. (108 mmoles) of 2-nitro-1-imidazoleacetic acid methyl ester in 1200 ml. of 0.1 N NaOH was refluxed for 15 minutes. The solution was cooled, acidified to pH 1.7 by the addition of 120 ml. of 1 N HCl and extracted with 3 × 1 l. of ethyl acetate. The combined ethyl acetate extracts were dried over anhydrous $MgSO_4$ and concentrated in vacuo to 600 ml. whereupon a solid formed. The slurry was refrigerated overnight, and the off white solid was collected, washed with ethylacetate and dried to give the product as a solid melting at 159°–160° (explodes, the decomposition point depends upon the rate of heating).

$\lambda_{max.}^{EtOH}$ 312 m$\mu$, $\epsilon = 7700$

The material was partly destroyed upon recrystallization from boiling ethylacetate or boiling acetone giving an appreciably darker material having a melting point of 146° (explodes).

EXAMPLE 49

Preparation of N-[3-(2-nitro-1-imidazolyl)lactoyl]piperidine

A mixture of 1.42 g. (6.2 mmoles) of 3-(2-nitro-1-imidazole) lactic acid ethyl ester in 22 ml. of piperidine was stirred until the solid dissolved (1.25 hr.). The solution was allowed to stand at room temperature for 75 hrs. and then the solution was allowed to evaporate in a shallow dish. The yellow gum which formed was dissolved in about 15 ml. of absolute ethanol, and the ethanol was allowed to evaporate. This process was repeated several times until a solid formed. The crystals were triturated with 4 ml. of absolute ethanol, filtered, washed with two times 1.5 ml. of ethanol, dried and recrystallized from 10 ml. of boiling absolute ethanol to give fine colorless needles of N-[3-(2-nitro-1-imidazolyl)lactoyl]piperidine, m.p. 131°–132°.

EXAMPLE 50

Preparation of N-isobutyl-3-(2-nitro-1-imidazolyl)lactamide

To a mixture of 170 ml. of absolute methanol plus 100 ml. of isobutylamine was added 8.04 g. of 3-(2-nitro-1-imidazole) lactic acid ethyl ester, and the mixture was stirred until the solid dissolved (about 15 min.) and the solution was allowed to stand at room temperature for about 22 hrs. The solution was then allowed to evaporate in a shallow dish to give a crystalline solid. The solid was slurried in absolute ethanol and the ethanol allowed to evaporate several times until the amine odor had largely disappeared. The ethanol moist solid was filtered, washed with 8 ml. of ethanol, dried and recrystallized from 50 ml. of boiling ethanol to give the product as pale yellowish needles, melting at 136°–137°, $\lambda_{max.}^{iPrOH}$ 312 m$\mu$, $\epsilon = 6200$

EXAMPLE 51

Preparation of N-isopropyl-3-(2-nitro-1-imidazole)propionamide

A solution of 13.4 g. (335 mmoles) of NaOH in 120 ml. of distilled water was cooled to 0° and 24.1 g. (410 mmoles) of isopropylamine was added. The solution was cooled to 0° and with vigorous stirring 26.0 g. (204 mmoles) of 3-chloropropionyl chloride was added dropwise maintaining the reaction temperature between 0° and 8°. The mixture was kept for an additional 10 min. in the cooling bath, and the solid was filtered, washed with distilled water, dried and recrystallized from boiling distilled water to give N-isopropyl-3-chloropropionamide, m.p. 69°–70.5°.

Sublimed 2-nitroimidazole (2.22 g., 19.6 mmoles) was dissolved in 4.3 ml. of 4.56 N $CH_3ONa$ in $CH_3OH$. A pinch of 2-nitroimidazole was added, and the color of the solution changed from orange to yellow. Twenty milliliters of N,N-dimethyl-formamide was added, the solution was heated to 152°, cooled to 110° and 3.12 g. (21 mmoles) of recrystallized N-isopropyl-3-chloropropionamide prepared as above was added. The reaction mixture was stirred at 110°–130° for 4 hours. The mixture was evaporated to dryness in vacuo (0.3 mm, bath 60°) and the residue was shaken vigorously with a mixture of 50 ml. of $CHCl_3$, 20 ml. of saturated aqueous $Na_2CO_3$ solution and 10 ml. of distilled water. The $CHCl_3$ was dried over anhydrous $MgSO_4$ and the filtrate was evaporated to dryness to give N-isopropyl-3-(2-nitro-1-imidazole)propionamide. The product was ground with 3 ml. of room temperature absolute ethanol, filtered and washed with 2 ml. of ethanol to give an off-white solid which was recrystallized from 3 ml. of boiling absolute ethanol to give crystals melting at 117°–118°.

$\lambda_{max.}^{iPrOH}$ 312 m$\mu$, $\epsilon = 8000$

EXAMPLE 52

Preparation of N-isopropyl-3-(2-nitro-1-imidazole)propionamide

Sublimed 2-nitroimidazole (2.04 g., 18 mmoles) was dissolved in an equivalent amount of $CH_3ONa$ in $CH_3OH$, and the solution was evaporated to an oil which was triturated with toluene and the resulting solid was filtered, washed with ether and dried. This solid was stirred and refluxed with a solution of 2.69 g. (18 mmoles) of N-isopropyl-3-chloropropionamide in 40 ml. of toluene for 11 days. The solid (unreacted sodium salt of 2-nitroimidazole plus NaCl, 2.12 g.) was filtered;

$$\lambda_{max.}^{0.1\ N\ NaOH}\ 375\ m\mu$$

About 20 percent of N-isopropyl-3-(2-nitro-1-imidazole) propionamide, $$\lambda_{max.}^{0.1\ N\ NaOH}\ 325\ m\mu$$

remained in the toluene.

EXAMPLE 53

Preparation of N-(3-methoxypropyl)-3-(2-nitro-1-imidazolyl)lactamide 3-(2-Nitro-1-imidazole)lactic acid ethyl ester (1.42 g., 6.20 mmoles) was stirred at room temperature with a mixture of 28 ml. of absolute methanol plus 7 ml. of 3-methoxypropylamine until the solid dissolved (1.5 hrs.). The solution was allowed to stand at room temperature for an additional 68 hrs., and then allowed to evaporate in a shallow dish to give crystals plus gum. The crystal and gum mixture was triturated with about 6 ml. of absolute ethanol (the gum solidified), filtered, washed with about 4 ml. of ethanol, dried and recrystallized from 10 ml. of boiling absolute ethanol to give N-(3-methoxypropyl)-3-(2-Nitro-1-imidazolyl)lactamide, m.p. 111°–112°, $$\lambda_{max.}^{iPrOH}\ 312\ m\mu,\ \epsilon=6100$$

EXAMPLE 54

Preparation of 2-nitro-1-imidazoleacetamide

Sublimed 2-nitroimidazole (1.00 g., 8.85 mmoles) was dissolved in 8.7 ml. of 1 N aqueous sodium hydroxide solution. There was added 1.24 g. (13.3 mmoles) of chloroacetamide, and the mixture was refluxed for 1.5 hrs. The reaction mixture was allowed to cool to room temperature, and the crystals which formed were collected, slurried with 3 to 4 ml. of 1N sodium hydroxide solution, filtered, washed with 1 N sodium hydroxide and then with distilled water and dried. After recrystallizing twice from 5 ml. of boiling distilled water, there was obtained crystalline 2-nitro-1-imidazoleacetamide of melting point 182°–183.5° having an IR spectrum identical to that of the material prepared by using dimethylformamide as solvent.

EXAMPLE 55

Preparation of N-methyl-2-(4,5-dimethyl-2-nitro-1-imidazolyl)acetamide

A solution of 2.39 g. (17.6 mmoles) of 4,5-dimethyl-2-nitroimidazole in 4 ml. of 4.44 N $NaOCH_3$ in $CH_3OH$ was evaporated in vacuo to a solid which was dissolved in 25 ml. of dimethylformamide along with 2.38 g. (22.2 mmoles) of N-methylchloroacetamide. The solution was refluxed for 1 min. and the solvent removed in vacuo. The tacky solid was dissolved in 160 ml. of distilled water plus 17 ml. of 1 N NaOH and the solution passed through a Dowex 1—X4 (Acetate) column 2.4 × 20 cm., 100—200 mesh and eluted with distilled water. This permitted separation of the product from the starting material. The fractions possessing $$\lambda_{max.}^{0.1\ N\ NaOH}\ 369\ m\mu$$

were evaporated to a tacky solid, dissolved twice in absolute ethanol and reconcentrated. The resulting material was extracted with ethylacetate and the ethylacetate evaporated. The resulting solid was recrystallized from 40 ml. of hot $CHCl_3$ to give crystals melting at 166°–169° and recrystallized a second time from 20 ml. of $CHCl_3$ to give the product as crystals melting at 170–172°.

$$\lambda_{max.}^{0.1\ N\ HCl}\ 368\ m\mu,\ \epsilon=11,700$$

EXAMPLE 56

Preparation of 4,5-dibromo-2-nitroimidazole

Ten grams (88.5 mmoles) of ground and sieved sublimed 2-nitroimidazole was dissolved in 270 ml. of 1N NaOH solution; the solution was cooled in an ice bath, stirred magnetically, and 10.0 ml. (den. 2.93, 29.3 g., 184 mmoles) of bromine was added dropwise. The color of the bromine bleached gradually and a precipitate formed toward the end of the addition. The final solution bleached pH paper and was acid to litmus. Cooling and stirring were continued for 20 min. and the solid was filtered, washed with 3 times 10 ml. of distilled water, dried and recrystallized twice from 40 parts of boiling distilled water (charcoal) to give chunky yellow crystals of 4,5-dibromo-2-nitroimidazole, m.p. 136.5° – 137° dec.

$$\lambda_{max.}^{0.1\ N\ NaOH}\ 385\ m\mu,\ \epsilon=13,500$$

EXAMPLE 57

Preparation of N-(p-Fluorobenzyl)-2-Nitro-1-Imidazoleacetamide

A solution of 5.00 g. of 2-nitro-1-imidazoleacetic acid methyl plus 10.0 g. of p-fluorobenzyl amine (Aldrich) in 50 ml. of methanol was allowed to sit at room temperature for 24 hours and was then refrigerated. The crystalline crude product, m.p. 190°–192° C. was filtered. This was recrystallized from 180 ml. of boiling absolute ethanol to give crystalline product, m.p. 193°–194°.

EXAMPLE 58

Preparation of N-(o-Fluorobenzyl)-2-Nitro-1-Imidazoleacetamide

A mixture of 55 ml. of absolute methanol plus 7.50 g. of 2-nitro-1-imidazoleacetic acid methyl ester plus 15 g. of o-fluorobenzylamine (Aldrich) was stirred at room temperature for 42 hours. The crude product was filtered, m.p. 190°–191°. Recrystallization from 275 ml. of boiling absolute ethanol gave needle crystals of the product, m.p. 190°–191°.

EXAMPLE 59

Preparation of N-(m-Fluorobenzyl)-2-Nitro-1-Imidazoleacetamide

A mixture of 55 ml. of absolute methanol 7.50 g. of 2-nitro-1imidazoleacetic acid methyl ester, and 15 g. of m-fluorobenzylamine (Aldrich) was stirred at room temperature for 43 hours. The crude product was filtered, m.p. 160°–162°. This was recrystallized from 185 ml. of boiling absolute ethanol to give the product, m.p. 162°–163°.

We claim:

1. A compound of the formula

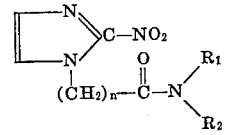

wherein $n$ is an integer from 2 to 6, $R_1$ is lower alkyl and $R_2$ is hydrogen or lower alkyl.

2. The compound according to claim 1 wherein the compound is N,N-dimethyl-4-(2-nitro-1-imidazole)-butyramide.

3. The compound according to claim 1 wherein the compound is N,N-dimethyl-6-(2-nitro-1-imidazole)-caproamide.

4. The compound according t claim 1 wherein the compound is N-methyl-4-(2-nitro-1-imidazole)-butyramide.

5. The compound according to claim 1 wherein said compound is N-methyl-5-(2-nitro-1-imidazole)-valeramide.
6. N-(3-methoxypropyl)-2-nitro-1-imidazole acetamide.
7. N-(2-aminoethyl)-2-nitro-1-imidazole acetamide.
8. 2-nitro-1-imidazoleacet-p-anisidide.
9. N-(p-fluorobenzyl)-2-nitro-1-imidazole acetamide.
10. N-(o-fluorobenzyl)-2-nitro-1-imidazole acetamide.
11. N-(m-fluorobenzyl)-2-nitro-1-imidazole acetamide.
12. N-benzyl-4-(2-nitro-1-imidazole)-butyramide.
13. N-(3,4-dimethoxyphenethyl)-2-nitro-1-imidazole acetamide.
14. N-benzyl-2-nitro-1-imidazole acetamide.
15. N-(o-chlorobenzyl)-2-nitro-1-imidazole acetamide.
16. N-(o-nitrobenzyl)-2-nitro-1-imidazole acetamide.

* * * * *